United States Patent [19]
Bolton et al.

[11] Patent Number: 5,219,016
[45] Date of Patent: Jun. 15, 1993

[54] RADIATOR, CONDENSER AND FAN SHROUD ASSEMBLY

[75] Inventors: James D. Bolton, Lancaster, N.Y.; Li-Jen P. Ho, Farmington Hills, Mich.; Michael E. Rutt, Dayton, Ohio

[73] Assignee: General Motors Corporation, Detroit, Mich.

[21] Appl. No.: 898,663

[22] Filed: Jun. 15, 1992

[51] Int. Cl.⁵ ............................... F28F 9/00
[52] U.S. Cl. .......................... 165/41; 165/67; 165/140; 165/69; 180/68.4; 248/213.3; 248/232; 248/635
[58] Field of Search ............. 165/67, 140, 69; 180/68.4; 248/232, 213.3, 213.4, 635

[56] References Cited
U.S. PATENT DOCUMENTS

| | | | |
|---|---|---|---|
| 4,579,184 | 4/1986 | Hiramoto | 165/67 |
| 4,979,584 | 12/1990 | Charles | 180/68.4 |
| 4,997,033 | 3/1991 | Ghiani et al. | 165/67 |
| 5,139,080 | 8/1992 | Bottom et al. | 165/67 |

FOREIGN PATENT DOCUMENTS

| | | | |
|---|---|---|---|
| 0178266 | 4/1986 | European Pat. Off. | 180/68.4 |
| 0219021 | 4/1987 | European Pat. Off. | 180/68.4 |
| 2558895 | 7/1977 | Fed. Rep. of Germany | 165/67 |
| 0012292 | 1/1984 | Japan | 165/67 |
| 0018390 | 1/1984 | Japan | 165/67 |
| 0202937 | 11/1984 | Japan | 180/68.4 |

Primary Examiner—John K. Ford
Attorney, Agent, or Firm—William A. Schuetz

[57] ABSTRACT

A fan shroud, radiator and condenser assembly for an air conditioned vehicle whereby a limited number of fasteners are utilized so as to provide a more efficient and maintenance free assembly. The components of the assembly are connected through a slidable connecting means, and a pre-stressed mounting panel is utilized to secure and maintain the components in their assembled positions.

5 Claims, 2 Drawing Sheets

RADIATOR, CONDENSER AND FAN SHROUD ASSEMBLY

The present invention relates, in general, to a fan shroud, radiator and condenser assembly of a vehicle and, more particularly, to an assembly that limits the utilization of fasteners so as to increase the reliability and quality of the assembly.

BACKGROUND OF THE INVENTION

Generally, almost all automotive air conditioned vehicles utilize a variety of attachment methods by which to attach the fan shroud, radiator, and condenser to one another and to the vehicle. Such attachment methods include spring clips, brackets, J-nuts, screws and an array of auxiliary parts. Due to vibrations caused by normal operation of the vehicle, the aforementioned attachment methods are susceptible to loosening and backing off from their tightened and secured positions. This leads to a loosening of parts, and therefore, a need for maintenance. The myriad of fasteners and auxiliary parts utilized also cause inefficiencies or increases in the material and labor cost involved in such an assembly.

It is also known to utilize a slidable connecting means between a condenser and radiator, as disclosed in the pending application, Bolton et al, Ser. No. 07/807,332 now U.S. Pat. No. 5,139,080 issued Aug. 18, 1992, which is assigned to the same assignee as the present application. The pending application of Bolton et al discloses a tab which fastens on to the condenser through the use of fasteners and slidably fits into a finger that is integral with the radiator.

SUMMARY OF THE INVENTION

It is a broad object of the present invention to provide a new and improved fan shroud, radiator and condenser assembly that limits or minimizes the use of fastener devices which may loosen and become unattached.

The present invention solves the above problem by providing an assembly of an air conditioned vehicle's fan shroud, radiator and condenser that utilizes a slidable connecting means for assembling parts as well as compressive forces to maintain the parts in the assembled position. The slidable connecting means feature is provided by integral fingers on the radiator which receive tabs that are integral with the fan shroud and condenser. A mounting panel overlies and engages the assembly of the fan shroud, radiator and condenser and is mounted in a pre-stressed position so as to provide a compressive downward force against the fan shroud and condenser thereby preventing any relative vertical movement between the fan shroud, radiator and condenser. The radiator is mounted to a lower support bracket of the vehicle, and the mounting panel is mounted to an upper support bracket of the vehicle.

DESCRIPTION OF THE PREFERRED EMBODIMENT

Figure 1:
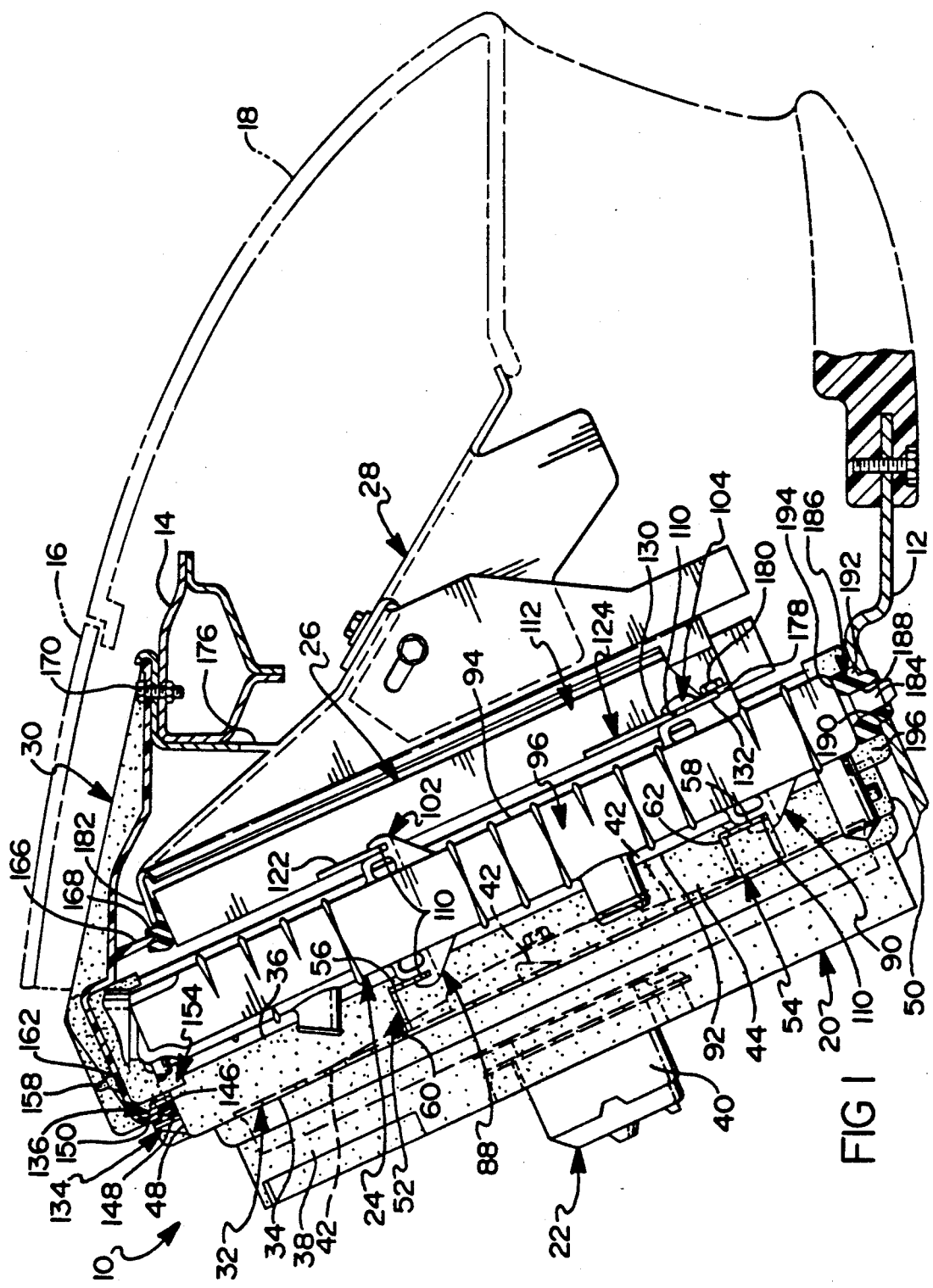
FIG. 1 is a side elevational view with parts shown in cross-section of the assembly of the present invention and showing the same in its assembled position mounted to upper and lower supports of a vehicle.

Referring to the drawings, the present invention will now be described in detail with reference to the preferred embodiment.

FIG. 1 is a side view showing a radiator, condenser, and fan shroud assembly (10) mounted in a vehicle in its assembled position. The assembly (10) is mounted to a transversely extending lower support or tie bar (12) and a transversely extending upper support or tie bar (14) of a vehicle (not shown). The assembly (10) is supported in a vertically inclined position by the lower support (12) and the upper support (14) so as to fit in a vehicle's engine compartment (partially shown) which is defined by a hood (16), a front end (18) of the vehicle, a passenger compartment wall (not shown), a pair of side body panels and the necessary clearance under the vehicle. However, the mounting of the assembly (10) is not limited to such a vertically inclined position and could be mounted in a vertical position.

As seen in FIG. 1, the assembly (10) is comprised of a fan shroud (20) which houses a conventional fan (22) used to cool the engine compartment of a vehicle. The fan shroud (20) is also a member of the assembly (10) and is slidably connected to a conventional radiator (24) which houses engine coolant for the vehicle's engine (not shown). The radiator (24) is slidably connected to a conventional condenser (26) which is used for the vehicle's air conditioning system (not shown) and is also a member of the assembly (10). The condenser (26) is connected to a conventional air baffle (28) which is utilized to direct air flow within the vehicle's engine compartment. A mounting panel (30) overlaps and engages the assembly (10) in a pre-stressed position and is utilized to secure the members (20), (24), (26) of the assembly (10) in the assembled position.

Figure 2:
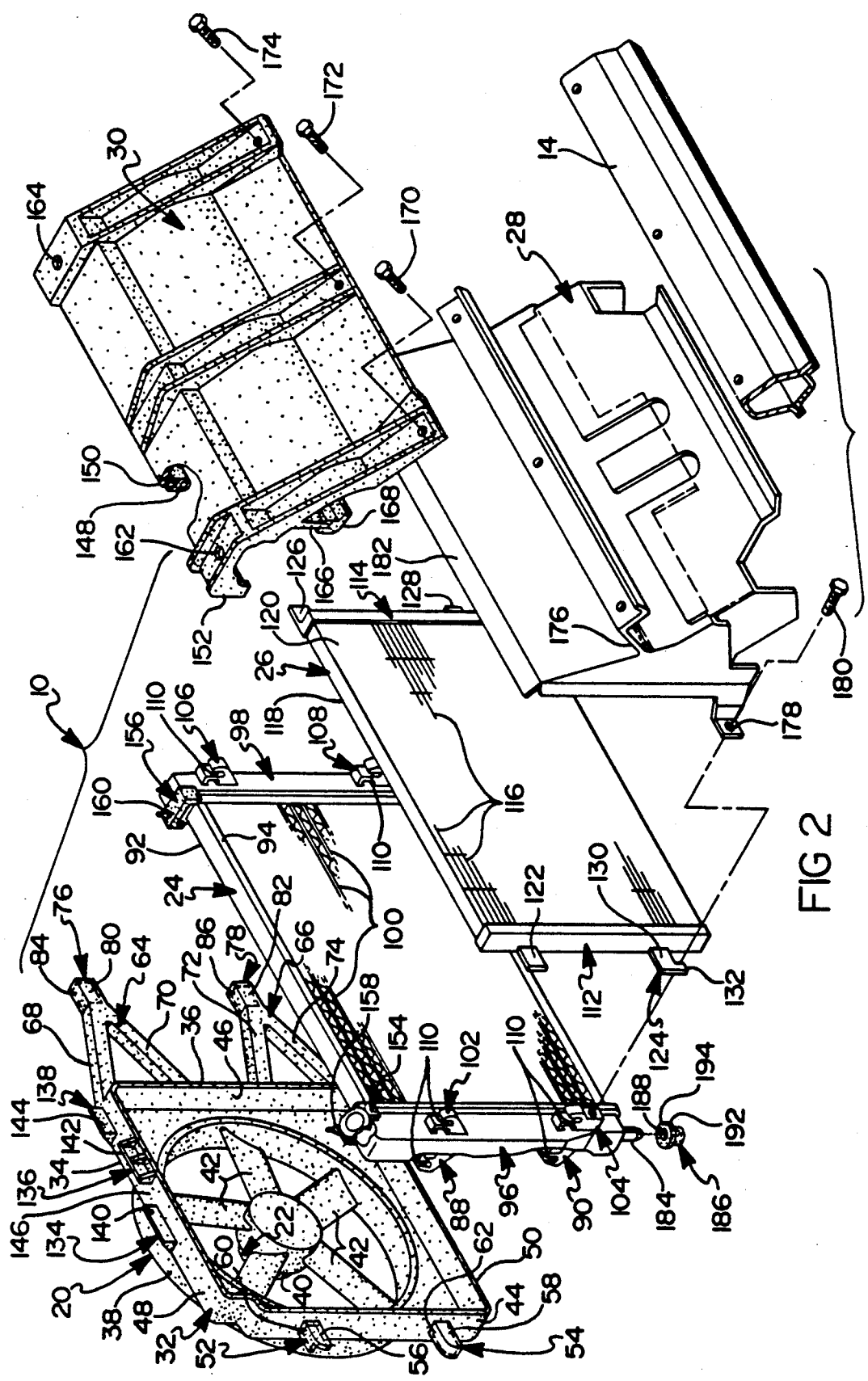
FIG. 2 is an exploded view with portions partially cut-away of the assembly of the present invention shown in FIG. 1.

As seen in FIG. 2, the fan shroud (20) comprises a substantially square frame (32) having a back side (34) and a front side (36) whereby the front side (36) is adjacent to the radiator (24). A circular shroud (38) is integral with the back side (34) of the frame (32). The fan (22) comprises a fan motor (40) and fan blades (42) and are mounted so that the fan blades (42) rotate within the circular shroud (38). The frame (32) is comprised of two side walls (44) and (46), a top wall (48) and a bottom wall (50). Integral with and extending substantially perpendicular from side wall (44) are two tabs (52) and (54) which are L-shaped in cross-section and vertically spaced along the side wall (44). The long legs (56) and (58) of the L-shaped tabs (52), (54) stand substantially parallel with the vertical plane of the frame (32) while the short legs (60) and (62) are substantially perpendicular from the top of the long legs (56), (58) so as to extend toward the back side (34) of the frame (32). The upper tab (52) is open-ended while the lower tab (54) is close-ended to provide a locator when assembling the fan shroud (20) to the radiator (24). Integral with and extending from the opposite side wall (46) are two V-shaped frames (64) and (66) which have their legs (68), (70), (72), (74) extending outward from the side wall (46), meeting at a point extending away from the side wall (46) to form a pair of tabs (76) and (78). The tabs (76), (78) are also L-shaped in cross section and have their long legs (80) and (82) standing substantially parallel with the vertical plane of the frame (32), while their short legs (84), (86) are substantially perpendicular from the top of the long legs (80), (82) and extend toward the back side (34) of the frame (32). Both tabs (76), (78) are open-ended. The four tabs (52), (54), (76), (78) aforementioned are received by four fingers (88), (90) (only two are shown) which extend from and are integral with the radiator (24), thereby providing a slidable connecting means between the fan shroud (20) and the radiator (24).

As seen in FIG. 2, the radiator (24) has a back side (92) that is adjacent to the fan shroud (20) and a front side (94) that is adjacent to the condenser (26). The radiator (24) comprises two end tanks (96) and (98) with coils (100) extending between the tanks (96), (98). Each radiator tank (96), (98) has a pair of vertically spaced fingers (88), (90), (102), (104), (106), (108) (two are not shown) extending from and integral with the back side (92) and the front side (94) of the tanks (96), (98). Each of the fingers (88), (90), (102), (104), (106), (108), (two are not shown) has a J-shaped cross section with the hook of the J-shape extending outward from the adjacent radiator tanks (96), (98) to form a slot (110). The fingers (88), (90), (only two of which are shown), on the back side (92) of the radiator (24) geometrically correspond in alignment to the four tabs (52), (54), (76), (78) on the fan shroud (20). The four tabs (52), (54), (76), (78) are designed so that the long legs (56), (58), (80), (82) of the L-shaped tabs (52), (54), (76), (78) provide a sliding snug fit into the slot (110) formed by the J-shaped fingers (88), (90), (only two of which are shown), as seen in FIG. 1. A similar set of J-shaped fingers (102), (104), (106), (108) extend from and are integral with the front side (94) of the radiator tanks (96), (98), as seen in FIG. 2.

The condenser (26) also has a pair of end tanks (112) and (114) and coils (116) extending between the tanks (112), (114). The condenser (26) has a back side (118) that is adjacent to the radiator (24) and a front side (120) that is adjacent to the air baffle (28). As seen in FIG. 2, four planar tabs (122), (124), (126), (128) are integral with and extend laterally as a partial continuation of the back side (118) of the condenser tanks (112), (114). Three of the tabs (122), (126), (128) are rectangular in shape while the fourth tab (124) is L-shaped. The L-shaped tab (124) has a long leg (130) that is similar to the other three tabs (122), (126), (128) while also having a short leg (132) that extends substantially perpendicular and downward from the free end of the long leg (130). The short leg (132) provides a locator for assembly by butting up against the outer side surface of the finger (104). These four tabs (122), (124), (126), (128) are in geometric alignment with the J-shaped fingers (102), (104), (106), (108) on the front side (94) of the radiator (24) and are designed so as to provide a sliding snug fit between the four tabs (122), (124), (126), (128) and the slot (110) provided by the four J-shaped fingers (102), (104), (106), (108), respectfully, as seen in FIG. 1.

The mounting panel (30) overlies and engages the fan shroud (20), radiator (24) and condenser (26) and provides downward pressure so as to prohibit relative vertical movement between the aforementioned members (20), (24), (26) by preventing the tabs (52), (54), (76), (78), (122), (124), (126), (128) from becoming unsecured from the J-shaped fingers (88), (90), (106), (108), (110), (112), (two are not shown), as seen in FIG. 1. The fan shroud (20) provides three staggered ribs (134), (136), (138) which are integral with and extend upwardly from the top wall (48) of the frame (32), as seen in FIG. 2. The ribs (134), (136), (138) are triangular in cross section and have a straight wall (140), (142), (144) rising substantially perpendicular from the top wall (48) of the frame (32). The ribs (134), (136), (138) are staggered so as to form a channel (146) between the straight walls (140), (142), (144) of the ribs (134), (136), (138) extending along the top wall (48) of the frame 32). As seen in FIG. 1, an elongated flexible elastomeric isolator (148), having a U-shaped upper portion, is fitted on the underside of the mounting panel (30) by having the U-shaped portion of the isolator (148) wrap around a downwardly extending transverse rib (150) at the rearward end (152) of the mounting panel (30). The isolator (148) has a hollow lower portion and is seated in the channel (146) created by the ribs (134), (136), (138) on the top wall (48) of the frame (32). The isolator (148) allows limited fore and aft adjustment of the mounting panel (30) relative to the fan shroud (20) and provides downward pressure to the fan shroud (20) when the mounting panel (30) is secured to the upper support (14). The downward pressure secures and retains the tabs (52), (54), (76), (78) of the fan shroud (20) in the fingers (88), (90), (only two of which are shown) on the back side (92) of the radiator (24).

As seen in FIG. 2, a pair of U-shaped insulators (154), (156) are seated over the radiator tanks (96), (98) at their upper ends. The underside of the mounting panel (30) is formed to correspond and mate to the shape of the insulators (154), (156). The insulators (154), (156) have a nipple (158), (160) which is integral with and extends upward from the insulator (154), (156) so as to mate with corresponding holes (162), (164) in the underside of the mounting panel (30). The nipple (158), (160) is flared so that once inserted through the hole (162), (164), the shoulder provided by the flare of the nipple (158), (160) will extend past the diameter of the hole (162), (164) so as to prevent the nipple (158), (160) from coming back through the hole (162), (164) thereby securing the insulator (154), (156) to the mounting panel (30). The flared nipple (158), (160) as a connecting means is a conventional and non-novel connector method. The insulators (154), (156) insulate the assembly (10) from vehicle vibration.

As seen in FIG. 1, the mounting panel (30) provides an elongated transversely extending rib (166) which is integral with and extends downward from the underside of the mounting panel (30) so as to be positioned over the top of the condenser (26) when in the assembled position. A flexible F-shaped isolator (168) wraps around the end of the rib (166) and is contact with the top of the condenser (26). The mounting panel (30) applies downward pressure to the condenser (26) through the isolator (168), thereby securing and maintaining the tabs (122), (124), (126), (128) of the condenser (26) in the fingers (102), (104), (106), (108), respectfully, on the front side (94) of the radiator (24). The F-shaped isolator (168) helps to isolate the assembly (10) from random vehicle vibration.

As seen in FIG. 2, the mounting panel (30) is connected to the upper support (14) of the vehicle through three screws (170), (172), (174). When being mounted, the mounting panel (30) is pre-stressed toward a downward direction, thereby providing downward pressure on the members (20), (24), (26) of the assembly (10).

The air baffle (28) is mounted adjacent the condenser (26), as seen in FIG. 1, and provides an arm (176) which lies between the mounting panel (30) and the upper support (14) of the vehicle. The three screws (170), (172), (174) used to connect the mounting panel (30) to the upper support (14) also pass through the arm (176)

of the air baffle (28). The air baffle (28) has two integral brackets (178) (only one shown) which are connected to two lower fingers (104), (108) on the front side (94) of the radiator (24) through the use of screws (180) (only one shown). The air baffle (28) also has a lip (182) which overlaps a portion of the isolator (168) that is in contact with the condenser (26). A second embodiment would be to eliminate the isolator (168) and have the rib (166) of the mounting panel (30) rest directly on the lip (182) of the air baffle (28), thereby applying downward pressure to the condenser (26) through the lip (182) of the air baffle (28).

The assembly (10) is connected to the lower support (12) of the vehicle through conventional means. One radiator tank (96) has a post (184) integral with and extending downward from the tank (96). A cylindrical isolator (186), having a hole (188) through its center that is slightly larger in diameter than the post (184) of the radiator (24), has a larger outside diameter at its top than at its bottom. As seen in FIG. 1, the smaller diameter of the isolator (186) mates with a hole (190) in the lower support (12) of the vehicle, and the larger diameter of the isolator (186) provides a shoulder (192) by which the isolator (186) rests against the lower support (12). The post (184) of the radiator (24) mates with the hole (188) of the isolator (186), and the radiator (24) rests on the top (194) of the isolator (186). The isolator (186) provides isolation of vehicle vibration to the assembly (10) as well as restricting longitudinal and lateral movement of the assembly (10) relative to the vehicle. The radiator tank (98) on the opposite end of the radiator (24) provides an insulator (196) similar to the insulators (154), (156) utilized at the top of the radiator (24). A flared nipple connector (not shown), similar to the flared nipples (158), (160) utilized on the previously described insulators (154), (156), is also utilized to secure the insulator (196) to the lower support (12) of the vehicle. Again, this insulator (196) aids in insulating the assembly (10) from random vehicle vibration.

When the assembly (10) is being assembled, the fan shroud (20) is attached to the radiator (24) by inserting the tabs (52), (54), (76), (78) into the fingers (88), (90), (only two of which are shown) on the back side (92) of the radiator (24). This is accomplished by raising the fan shroud (20) relative to the radiator (24) and lowering the fan shroud (20) so that the long legs (56), (58), (80), (82) of the tabs (52), (54), (76), (78) snugly slide into the slot (110) of the fingers (88), (90), (only two of which are shown). The fan shroud (20) is moved laterally until the close-ended tab (54) of the fan shroud (20) butts up against the corresponding finger (90) on the radiator (24). The condenser (26) is attached to the front side (94) of the radiator (24) utilizing the same process. The three assembled components (20), (26), (28) are then placed in the engine compartment of the vehicle, and the post (184) extending downward from the radiator (24) is inserted in the hole (188) provided in the isolator (186) mounted in the lower support (12) of the vehicle. The air baffle (28) is then connected to the lower fingers (104), (108) on the front side (94) of the radiator (24). The mounting panel (30) is placed over the assembly (10) so as to engage all components (20), (24), (26), and the mounting panel (30) is then secured to the upper support (14) of the vehicle by threading the three screws (170), (172), (174) through the mounting panel (30), the air baffle (28) and into the lower support (12) of the vehicle.

The foregoing description is of a preferred embodiment of the invention, and it will be understood by those of ordinary skill in the art that various modifications and changes may be made without departing from the scope of the invention as defined in the claims.

We claim:

1. In a vehicle having vertically spaced, horizontally disposed upper and lower supports, and an assembly of a radiator, a condenser of a vehicular refrigeration system and a fan shroud supported by said lower support, the improvement comprising:
   means for slidably connecting said radiator to said condenser and said radiator to said fan shroud and for maintaining said condenser and said fan shroud in spaced relation to said radiator;
   a mounting panel connected to said upper support, and said mounting panel overlying and engaging said assembly and applying pressure to said condenser and said fan shroud so as to prevent relative vertical movement between said radiator, said condenser and said fan shroud.

2. In a vehicle having vertically spaced, horizontally disposed upper and lower supports, and an assembly of a radiator, a condenser of a vehicular refrigeration system and a fan shroud supported by said lower support as stated in claim 1, wherein said means for slidably connecting said radiator to said condenser and said radiator to said fan shroud and for maintaining said condenser and said fan shroud in spaced relation to said radiator comprises:
   a plurality of first tabs integral with and extending from said condenser;
   a plurality of first fingers integral with and extending from said radiator and slidably receiving said first tabs of said condenser in a slot formed by said first fingers;
   a plurality of second tabs integral with and extending from said fan shroud; and
   a plurality of second fingers integral with and extending from said radiator and having said second fingers slidably receiving said second tabs in a slot formed by said second fingers.

3. In a vehicle having vertically spaced, horizontally disposed upper and lower supports, and an assembly of a radiator, a condenser of a vehicular refrigeration system and a fan shroud supported by said lower support, the improvement comprising:
   a plurality of first tabs integral with and extending from said fan shroud;
   a plurality of first fingers integral with and extending from said radiator and slidably receiving said first tabs of said fan shroud in a slot formed by said first fingers;
   a plurality of second tabs integral with and extending from said condenser;
   a plurality of second fingers slidably receiving said second tabs in a slot formed by said second fingers; and a mounting panel connected to said upper support, and said mounting panel overlying and engaging said assembly and applying pressure to said condenser and said fan shroud so as to secure said first tabs and second tabs in said slot of said first fingers and said second fingers, respectively, of said radiator.

4. In a vehicle having vertically spaced, horizontally disposed upper and lower supports, and an assembly of a radiator, a condenser of a vehicular refrigeration system and a fan shroud supported by said lower support as stated in claim 4, wherein said mounting panel includes;
- a first isolator engaging said fan shroud;
- a second isolator engaging said condenser; and
- means for mounting said mounting panel to said radiator.

5. In a vehicle having vertically spaced, horizontally disposed upper and lower supports, and an assembly of a radiator, a condenser of a vehicular refrigeration system and a fan shroud supported by said lower support, and said assembly having a top side and a bottom side, the improvement comprising:
- a plurality of first tabs integral with and extending from said fan shroud;
- a plurality of first fingers integral with and extending from said radiator and slidably receiving said first tabs of said fan shroud in a slot formed by said first fingers;
- a plurality of second tabs integral with and extending from said condenser;
- a plurality of second fingers integral with and extending from said radiator and slidably receiving said second tabs in a slot formed by said second fingers;
- a plurality of staggered ribs integral with and extending from said fan shroud;
- an air baffle connected to said second fingers, said upper support and said condenser;
- a mounting panel connected to said upper support, said isolator and said air baffle, and said mounting panel overlying and engaging said top side of said assembly and applying pressure to said condenser and said fan shroud through said air baffle and said isolator, respectively, so as to secure said first tabs and said second tabs in said first fingers and said second fingers, respectively, of said radiator by prohibiting relative vertical movement between said fan shroud, said radiator and said condenser;
- a pair of first insulators connected to said mounting panel and said radiator;
- a second insulator connected to said lower support of said vehicle and said radiator;
- a substantially cylindrical post connected to and extending from said bottom side of said radiator; and
- an isolator connected to said lower support of said vehicle, and said isolator having a circular opening and receiving said post in said circular opening.

* * * * *